COLOR TELEVISION SYNCHRONIZATION

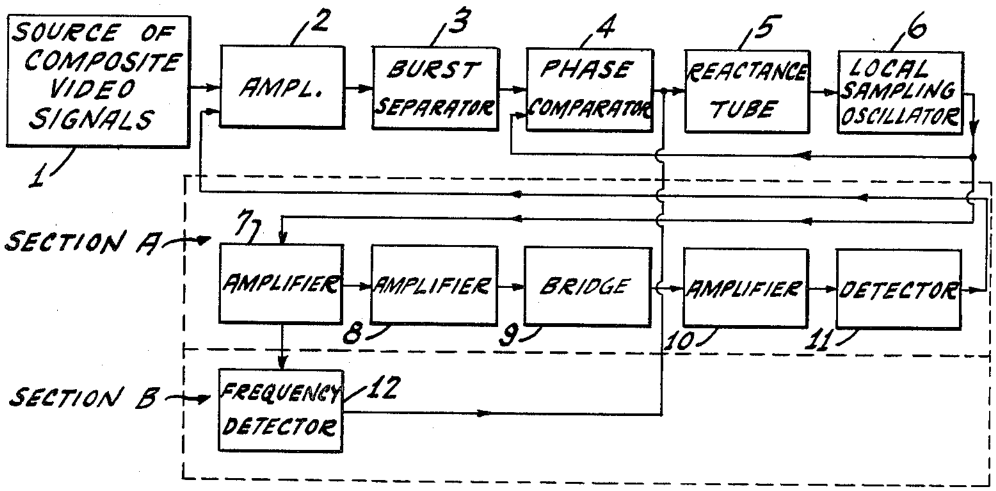
Fig-1
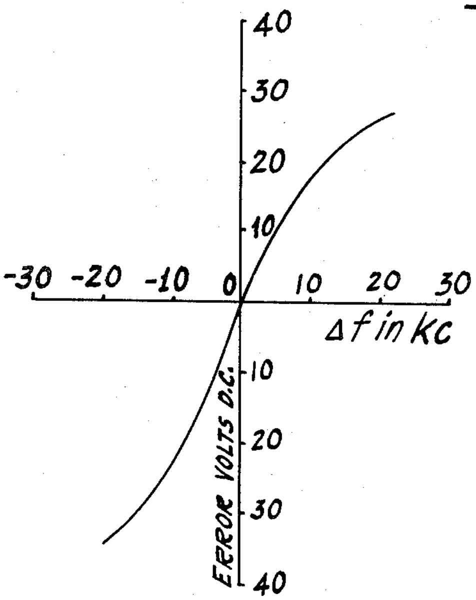
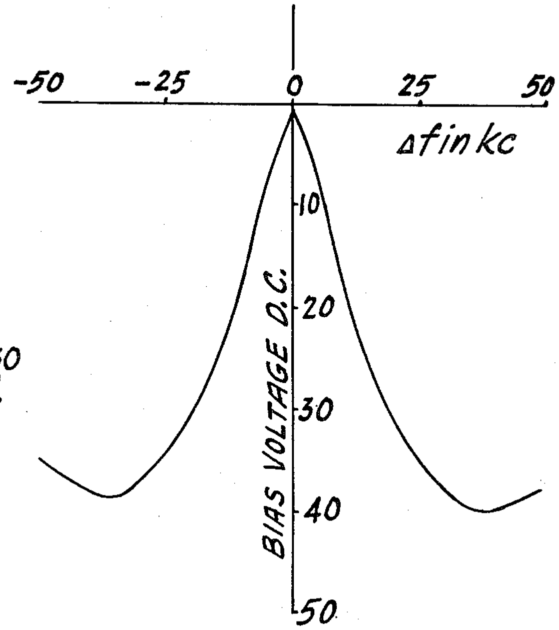
Fig-3
Fig-4
INVENTORS
EDWARD S. ROGERS &
REGINALD A. HACKLEY
BY [signature]
ATTORNEY INVENTORS
EDWARD S. ROGERS &
REGINALD A. HACKLEY
BY [signature]
ATTORNEY 2,771,557

Edward S. Rogers, Trenton, and Reginald A. Hackley, Princeton, N. J., assignors to Radio Corporation of America, a corporation of Delaware Application February 5, 1953, Serial No. 335,206

8 Claims. (Cl. 250—36)

This invention relates to a method for maintaining frequency control of oscillators and particularly to the prevention of "false phase lock" in color television receivers.

In color television receivers it is highly essential that the phase and frequency of the local sampling oscillator, which is used to extract color information from the incoming composite video signal, be exactly synchronized in phase and frequency with the corresponding sampling oscillator in the transmitter apparatus. For this purpose a "burst" of the color subcarrier frequency is positioned on the back porch of the horizontal blanking pulse. A full explanation of the workings of the burst may be found in a pending application Serial No. 143,800, now Patent No. 2,728,812, dated Dec. 27, 1955, of A. V. Bedford or in "Electronics," February 1952 at page 96. The phase of this burst is compared with the oscillations from the local reference frequency generator at the receiver. An error signal derived from this comparison is used to control a reactance tube which tends to pull the local oscillator back to the subcarrier frequency. Should there be a failure to achieve this synchronization the demodulation of the video wave in the receiver will take place in the wrong phase relation to the video modulation so that the rendition of color on the picture tube will be erroneous and distorted.

Fourier analysis of the energy distribution of the burst frequency occurring at the horizontal line frequency, i. e. 15,750 cycles, indicates that there will be sidebands of the subcarrier frequency positioned at integral multiples of 15,750 cycles. Thus, if there is a subcarrier frequency of 3.85 mc., for example, there will be sidebands at 3.865750 mc. and at 3.834250 mc. and corresponding sidebands at other multiples of the horizontal line frequency away from the central subcarrier frequency.

In conventional phase comparators used in color television receivers a minimum error voltage will be developed at the burst or subcarrier voltage. On either side of this frequency, however, the error voltage will tend strongly to pull the oscillator frequency back to the point where the error voltage is a minimum. This is known as "phase lock."

There are other frequencies where secondary minimal error voltages will be developed, i. e., when the oscillator has a frequency in the neighborhood of the sidebands explained previously. Here, too, if the oscillator tends to stray on either side of the sideband frequency, the derived error voltage will tend to pull it back to the sideband frequency so that a "false phase lock" occurs.

Several alternative methods have been proposed to overcome the effects of this false phase lock. One has been to make the local sampling oscillator so stable that when burst is absent it will always operate within the limits required for correct phase lock. This method has been quite successful except that there are times such as during the first few minutes of operation of a receiver, after selecting a new station, and during periods of interference that the correct phase lock is lost and a false lock is established.

A possible way of preventing too wide an excursion from the subcarrier frequency by the local oscillator is by temperature compensated oscillator tank circuits and regulated power supplies. This method is extremely costly and requires relatively expensive equipment for its accomplishment.

The object of the present invention is to provide a means for preventing a frequency swing of the local oscillator so great as to cause a false phase lock, and further eliminating the effects of burst on the local oscillator via the phase comparator when the swing is greater than a predetermined range.

The present invention comprises two main sections. The first section provides for a biasing off of the burst input to the phase comparator when the local oscillator frequency differs from the subcarrier by an amount large enough to permit false phase lock. The second section is an auxiliary AFC circuit which controls the local oscillator frequency in the absence of burst and stabilizes it within the range required for correct phase lock. The invention is described in the description which is more easily understood in conjunction with the accompanying drawings in which:

Figure 1 is a block diagram of a preferred embodiment of our invention;

Figure 3 is a graph showing the relationship of bias applied to the burst sync channel in response to the deviation by the local oscillator from the subcarrier frequency; and Figure 4 shows the response of the second section.

Figure 2:
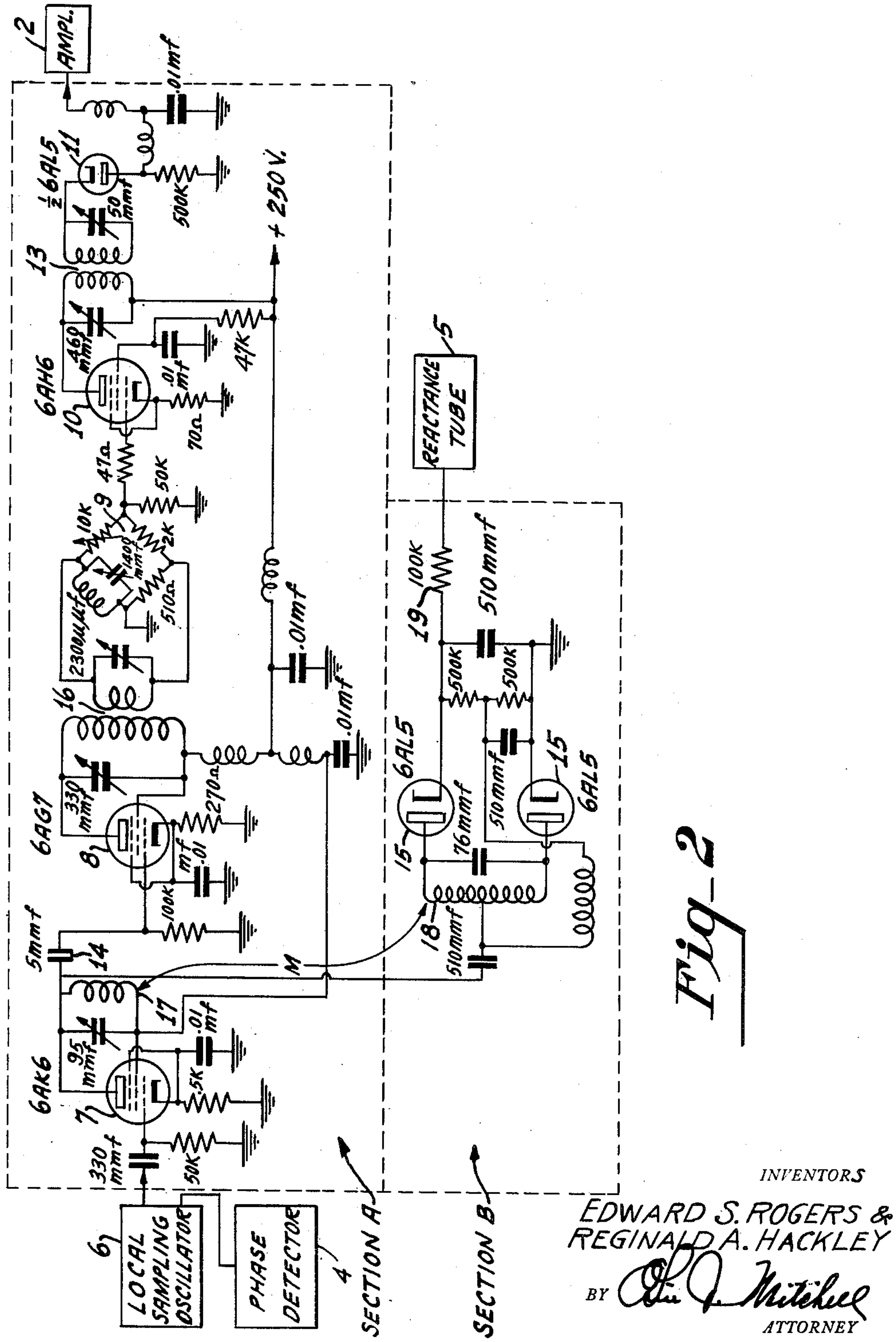
Figure 2 is a schematic representation of a preferred embodiment.

Referring to Figure 1 a source of composite video signals 1 supplies the entire composite waveform to amplifier 2. Burst separator 3 removes the burst from the amplified composite wave and feeds it to one input section of phase comparator 4. Local sampling oscillator 6 feeds a portion of its output back to the other part of the input of phase comparator 4 so that an error voltage derived by comparison of the phases of the two outputs is fed to reactance tube 5 which controls the local oscillator 6. The described circuit to this point is a conventional method for maintaining a desired phase relation between the burst and the local oscillations from oscillator 6.

Within the topmost portion of the rectangle formed by broken lines the first section labelled Section "A" of our preferred embodiment is depicted. A second portion of the output of the oscillator 6 is fed to amplifier 7 which is in series with amplifier 8 whose output is passed through a bridge circuit 9 from which an A. C. voltage is obtained. This A. C. voltage is a function of the deviation of the frequency of the local oscillator 6 from the subcarrier frequency. The A. C. voltage is amplified in block 10 and detector 11 demodulates a negative only D. C. therefrom feeding it back to bias the grid of amplifier 2. In the event of a deviation of frequency by the local oscillator 6 which falls outside a predetermined range a negligible portion of the output of source 1 is passed by amplifier 2.

It is to be understood, however, that the incoming burst can be effectively prevented from being compared with the local oscillator frequency by other cut off arrangements. The negative voltage can be applied alternatively at any stage before the reactance tube 5 grid. In the embodiment illustrated the negative voltage was applied to amplifier 2 because a lower level of negative voltage is then required to accomplish the desired result.

The lower enclosed broken line rectangle labelled Section "B," comprises a frequency detector 12 which receives part of the output of amplifier 7. The output of frequency detector 12 is then used to bias the reactance tube 5 so as to pull local oscillator 6 within a range of operation where the possibility of incorrect phase lock is minimized.

*Section "A" operation*

Measurements made on existing burst synchronizer chassis indicate that false phase lock can occur when the oscillator swing is greater than the ±5 kc. range, depending upon the burst level and the reactance tube sensitivity. With a non temperature-compensated reactance controlled oscillator a frequency shift of ±6 kc. during a 25° C. temperature change is possible. Furthermore variations of ±10% in the plate and filament supply voltages can result in additional ±4 kc. change. Thus it is seen that the oscillator can drift as much as ±10 kc. from the subcarrier frequency, but the burst can only provide correct phase lock over a ±5 kc. range.

In view of these measurments it is apparent that the burst should be effectively suppressed whenever the local oscillator frequency differs by more than ±5 kc. from its median frequency. In Section "A" of Figure 2 part of the output of local oscillator 6 is coupled to the control grid of tube 7 which is a video amplifier. By way of coupling condenser 14 the amplifier output is further amplified in tube 8 whose output is passed through tuned transformer 16 to a bridge 9 which is balanced at the subcarrier frequency. When the local oscillator frequency is applied to the bridge a voltage which depends on the displacement of the local oscillator frequency from the subcarrier frequency is coupled to the control grid of tube 10 where it is amplified. Transformer 13 couples the output of tube 10 to rectifier tube 11 which may be any unidirectional current device such as a single diode or half of a 6AL5 as shown. A curve of the rectified D. C. voltage as a function of the displacement in frequency is shown in Figure 3. This D. C. voltage is used to gate amplifier 2 so that no appreciable output signal appears in its plate circuit. The circuit is arranged so that a local oscillator frequency excursion of more than ±5 kc. from the subcarrier frequency will produce the desired gating effect. However, different burst sync chassis may have different characteristics so that false phase lock can occur in either a narrower or broader region that ±5 kc. The design of Section "A" should be changed accordingly.

*Section "B" operation*

The measurements on existing burst synchronizing chassis previously alluded to showed that the oscillator frequency can drift as much as ±10 kc. from the median frequency and that the burst can provide correct phase only over a ±5 kc. range. Section "A," as explained above, effectively suppresses the burst whenever the swing is greater than ±5 kc.

Once the burst has been suppressed, phase comparator 4 has nothing to compare with the output of local oscillator 6 so that it is for all intents and purposes ineffectual. Hence some other source of control voltage for reactance tube 5 must be provided. Section "B" has been so designed that it can act as an auxiliary frequency control over a ±20 kc. band centered at the reference frequency.

When the local oscillator 6 frequency swings away from the reference frequency, an error voltage is derived across winding 17 (see Section "A") and winding 18 which are mutually coupled and which together constitute a discriminator transformer.

The coil balance is such that zero error signal is derived when local oscillator 6 is on proper frequency. In the event that it drifts an error voltage, ascertainable with reference to Figure 4, is derived by tube 15 and coupled via resistor 19 to the grid of reactance tube 5 which in turn restores local oscillator 6 to the proper frequency.

In the embodiment illustrated, the auxiliary AFC Section "B" provides about 2.5 volts per kc. and the reactance tube has a sensitivity of about 8 kc. per volt. The product of these gives the correction ratio which is 20 to 1. That is, if the oscillator were 20 kc. off the balance frequency, application of the error voltage would correct the oscillator to within 1 kc. of true balance.

The frequency stability requirements of the bridge and auxiliary AFC circuit, i. e. Section "B," are important for satisfactory operation once the desired frequency range of operation is determined. Assuming a correction error of 1 kc. in the auxiliary AFC, the balance frequencies of the bridge and the auxiliary AFC circuits must always be within ±2 kc. of the subcarrier or sampling frequency. This is ±560 P. P. M. or ±22 P. P. M./°C. if a 25° C. temperature change is assumed. The stability of the balanced frequency of the bridge of the auxiliary AFC circuit depends almost entirely upon the tuned circuit elements. This means that high quality stable inductors and capacitors should be used. The inductors used in both the bridge and the discriminator circuit were single layer coils wound with No. 31 formex wire cemented on ceramic forms. Inductors of this type have a temperature coefficient of about +60 P. P. M./°C. and exhibit good secular stability. By tuning these coils with a capacitor whose temperature coefficient is −60 P. P. M./° C. the temperature dependence of the tuned circuit can be minimized. If ceramic type negative temperature capacitors which have a tolerance of ±30 P. P. M./° C. are used the tolerance of the frequency stability is ±15 P. P. M./° C. This is well within the limits of ±22 P. P. M./° C. required.

Circuit values, tube numbers, and specifications have been given in Figure 2 and elsewhere herein but it is not essential that they be strictly followed as they are only meant to be representative. Satisfactory results were obtained with the circuitry illustrated but alternative forms are possible without any departure from the spirit of this invention. For example tubes 11 and 15 could be replaced by crystal diodes. Similarly, the number of amplifiers can be either increased or decreased depending upon the gain required or upon other considerations.

Having thus described the invention what is claimed is:

1. Apparatus for controlling the frequency of an oscillator whose output is compared in phase with a reference frequency whereby a controlling potential is applied to a reactance tube across said oscillator including amplifying means adapted to be coupled to said oscillator, bridge means coupled to said amplifying means, said bridge means developing an A. C. voltage only when said oscillator deviates from its median frequency, rectifying means coupled to said bridge means for producing only a negative D. C. voltage in response to said deviation, said rectifying means being adapted to apply said negative D. C. voltage so as to substantially prevent said phase comparison when said deviation exceeds a predetermined number of cycles, frequency detecting means coupled to said oscillator for deriving an error voltage when said oscillator deviates from its median frequency, said frequency detecting means being adapted to apply said error voltage to control said reactance tube when said deviation exceeds the said predetermined number of cycles.

2. In a color television system wherein the output of a local sampling oscillator is compared in phase with the incoming burst to derive a voltage which is applied to a reactance tube across said local oscillator, the combination including a first amplifier adapted to be coupled to said local oscillator, said first amplifier having an output circuit, said output circuit comprising a first transformer, said first transformer having a primary winding and secondary winding, said primary winding and said secondary winding being tuned to said burst frequency, a second amplifier coupled to said output circuit, a second transformer tuned to said burst frequency coupled to said second amplifier, a bridge circuit coupled to said second transformer, said bridge circuit containing a parallel resonant circuit resonant to said burst frequency, said bridge circuit being adapted to develop an A. C. voltage only when a frequency other than the burst frequency is impressed upon it, a third amplifier coupled to said bridge circuit for amplifying said A. C. voltage, a third transformer tuned to said burst frequency coupled to said first amplifier, a rectifier coupled to said third transformer, said rectifier being adapted to effectively prevent the phase comparison of said burst with said local oscillator output when said local oscillator deviates more than approximately ±5 kilocycles from said burst frequency, a frequency discriminator coupled to said secondary winding of said first transformer, said discriminator being adapted to derive an error voltage whose amplitude is a function of the deviation of the said local oscillator frequency from said burst frequency, said discriminator being adapted to apply said error so as to control said reactance tube when the frequency of said local oscillator deviates more than approximately ±5 kilocycles from said burst frequency.

3. Apparatus for controlling the frequency of an oscillator whose output is compared in phase with a reference frequency signal to derive a controlling voltage which is applied to a reactance tube across said oscillator comprising means coupled to said oscillator for preventing the phase comparison of said reference signal and the output of said oscillator in response to a deviation of said oscillator of more than a predetermined number of cycles from its resonant frequency, and means adapted to control said reactance tube in response to said frequency deviation of said oscillator.

4. In a color television receiver adapted to receive a color television signal including intermittent color synchronizing bursts, the combination of: means to separate said bursts from said color television signal; an oscillator; a first frequency and phase comparison means wherein said separated bursts are compared in phase with the output of said oscillator to derive a first control voltage indicative of phase difference; a reactance tube operatively connected to control the frequency and phase of said oscillator responsive to said control voltage; means coupled to said oscillator for substantially preventing said phase comparison when said oscillator frequency deviates more than a predetermined number of cycles from its resonant frequency; means coupled to said oscillator to develop a second control voltage representative of the deviation of oscillator frequency from the frequency of said bursts; and means to employ said second control voltage to control said reactance tube to adjust the frequency of said oscillator toward the frequency of said bursts when said frequency deviation of said oscillator exceeds said predetermined number of cycles.

5. In a color television circuit adapted to receive a color television signal including intermittent color synchronizing bursts having prescribed phase and frequency, the combination of: means to separate said bursts from said color television signal, an oscillator having an output at substantially said prescribed frequency; means to compare the phase of said oscillator with the phase of said separated bursts to derive a controlling voltage; a reactance tube responsive to said controlling voltage and coupled to said oscillator to control the frequency of said oscillator; means coupled to said oscillator for deriving a second voltage when said oscillator deviates from the burst frequency; means responsive to said second voltage to substantially prevent said phase comparison when said frequency deviation by said oscillator exceeds a predetermined number of cycles; frequency detecting means coupled to said oscillator for deriving an error voltage in response to a deviation of said oscillator from said prescribed frequency; and means to apply said error voltage to control said reactance tube when said frequency deviation of said oscillator exceeds the predetermined number of cycles.

6. In a color television receiver adapted to receive a color television signal including intermittent color synchronizing bursts comprising in combination: means to separate said color synchronizing bursts from said color television signal; an oscillator developing an output signal; a reactance tube coupled to control the frequency and phase of said oscillator; frequency detecting means coupled to said oscillator to derive an error voltage in response to a deviation of frequency of said oscillator from a frequency related to burst frequency; means to apply said error voltage to said reactance tube; and means including said error voltage applying means to use only said error voltage to control said reactance tube when said frequency deviation of said oscillator exceeds a predetermined number of cycles.

7. In combination: a source of composite color video signals of the type having a color synchronizing burst of a subcarrier frequency; a local oscillator having an output signal at substantially burst frequency; a burst separator coupled to said source to develop separated bursts; a phase comparator responsive to said separated bursts and to the output signal of said oscillator to develop a reference signal; a reactance tube coupled to control the frequency of said local oscillator responsive to said reference signal; bridge means coupled to said local oscillator; said bridge means developing an A. C. voltage only when said oscillator deviates from said bursts frequency; rectifying means coupled to said bridge means for deriving a negative D. C. potential in response to said A. C. voltage; means for using said negative D. C. potential to prevent said bursts from being applied to said phase comparator when the frequency of said oscillator deviates more than a predetermined number of cycles; means coupled to said local oscillator for deriving an error voltage in response to a deviation by the oscillator from its resonant frequency; and means coupling said error voltage deriving means to said reactance tube to cause said error voltage to control said reactance tube in response to said frequency deviation of said oscillator of more than said predetermined number of cycles.

8. In a color television receiver adapted to receive a color television signal including intermittent color synchronizing bursts, comprising in combination: means to separate said color synchronizing bursts from said color television signal; an oscillator to develop an output signal at substantially the frequency of said bursts; a reactance tube responsive to a control signal and coupled to said oscillator to control the frequency and phase of said oscillator; phase comparison means to compare the phase of said separated bursts and the output signal of said oscillator and to develop a control signal indicative of any phase difference; means to apply said control signal to said reactance tube; means to measure the frequency of said output signal of said oscillator and to derive an error signal indicative of any frequency deviation of said output signal from a prescribed frequency; and means responsive to said error signal to prevent said phase comparison in said phase comparison means when said frequency deviation exceeds a prescribed number of cycles.

References Cited in the file of this patent

UNITED STATES PATENTS

| | | |
|---|---|---|
| 2,567,286 | Hugenholtz | Sept. 11, 1951 |
| 2,589,387 | Hugenholtz | Mar. 18, 1952 |
| 2,594,263 | Munster | Apr. 22, 1952 |
| 2,601,436 | Hugenholtz | June 24, 1952 |
| 2,605,425 | Hugenholtz | July 29, 1952 |
| 2,624,005 | Hansen | Dec. 30, 1952 |